(12) United States Patent
Wei et al.

(10) Patent No.: US 9,400,118 B2
(45) Date of Patent: Jul. 26, 2016

(54) HOT WATER SUPPLY SYSTEM AND METHOD THEREOF

(71) Applicant: YUAN ZE UNIVERSITY, Taoyuan County (TW)

(72) Inventors: Jung-Tzung Wei, Taoyuan County (TW); Yu-Chih Huang, Taoyuan County (TW)

(73) Assignee: YUAN ZE UNIVERSITY, Taoyuan County (TW)

( * ) Notice: Subject to any disclaimer, the term of this patent is extended or adjusted under 35 U.S.C. 154(b) by 418 days.

(21) Appl. No.: 14/081,607

(22) Filed: Nov. 15, 2013

(65) Prior Publication Data

US 2015/0034073 A1 Feb. 5, 2015

(30) Foreign Application Priority Data

Aug. 2, 2013 (TW) .............................. 102127762 A

(51) Int. Cl.
| | |
|---|---|
| *F24D 15/04* | (2006.01) |
| *F24D 17/00* | (2006.01) |
| *F24D 17/02* | (2006.01) |
| *F24D 19/10* | (2006.01) |

(52) U.S. Cl.
CPC ............ *F24D 17/0068* (2013.01); *F24D 17/02* (2013.01); *F24D 19/106* (2013.01); *F24D 2200/08* (2013.01); *F24D 2200/12* (2013.01); *F24D 2200/14* (2013.01); *Y02B 10/20* (2013.01); *Y02B 10/70* (2013.01)

(58) Field of Classification Search
CPC .... F24D 17/068; F24D 17/02; F24D 2200/12
USPC .......................................... 126/714, 615, 640
See application file for complete search history.

(56) References Cited

U.S. PATENT DOCUMENTS

| | | | | |
|---|---|---|---|---|
| 4,173,213 A | * | 11/1979 | Kelly ......................... | F24J 2/10 126/604 |
| 4,320,663 A | * | 3/1982 | Francia ................. | F22B 35/104 122/451.1 |
| 5,317,670 A | * | 5/1994 | Elia ...................... | F24D 19/1051 126/362.1 |
| 2006/0011193 A1 | * | 1/2006 | Rong .................. | F24D 17/0068 126/651 |
| 2012/0125321 A1 | * | 5/2012 | Graboski ................ | F28D 7/022 126/643 |

* cited by examiner

*Primary Examiner* — Avinash Savani
(74) *Attorney, Agent, or Firm* — Li & Cai Intellectual Property (USA) Office

(57) ABSTRACT

The invention disclosure provides a hot water supply system and method thereof which can control a solar heating unit, a first heat-pump unit, a boiler unit, and an electric heater unit through a control unit to heat water. The control unit operates in a pre-heating period and a heating period after the pre-heating period. In the pre-heating period, the solar heating unit and the first heat-pump unit preheat water. In the heating period, the boiler unit further heats water coming from the solar heating unit and the first heat-pump unit to an exit temperature and stores water in the boiler unit and the electric heater unit so as to provide water to an outflow device. The invention integrates many water heaters in one system, so as to improve the efficiency of generation of hot water and achieve the objectives of energy conservation and carbon reduction.

12 Claims, 4 Drawing Sheets

HOT WATER SUPPLY SYSTEM AND METHOD THEREOF

BACKGROUND OF THE INVENTION

1. Field of the Invention

The instant disclosure relates to a water supply system and method thereof; in particular, to a hot water supply system of integrating a plurality of water heater for heating water and a method thereof.

2. Description of Related Art

The heater of fuel boiler can provide continuous and stable hot water. For the institution (e.g., a school) consuming great amounts of hot water, the boiler heater is often utilized to heat water for providing hot water. In order to improve the service quality and considerations of diverse needs, the boiler heater usually continuously provides hot water for 24 hours a day. The conventional boiler heater consumes kerosene to heat water. However, the price of the kerosene continuous to rise, and the combustion of the kerosene generates great amounts of carbon dioxide. Heating costs would be increased, and the great amounts of generated carbon dioxide could cause global warming when the single type of boiler is only utilized to heat water. Therefore, it is more important to find a way to reduce the operation time of the boiler when providing sufficient hot water for the institution consuming grate amounts of hot water.

SUMMARY OF THE INVENTION

The object of the instant disclosure is to provide a hot water supply system and a method thereof, in order to integrating a plurality of water heater in the hot water supply system. The hot water supply system utilizes appropriate water heater to heat water in each operation period for improving the efficiency of hot water generation. Additionally, utilizing the plurality of water heater devices to reduce use of the boiler unit, reduce use of kerosene, thus energy saving and carbon reduction could be achieved.

In order to achieve the aforementioned objects, according to an embodiment of the instant disclosure, a hot water supply system is offered. The hot water supply system comprises a solar heating unit, a boiler unit and a control unit. The solar heating unit has a small size water tank to store water and heat water. The boiler unit comprises a boiler machine and a boiler water tank. The boiler machine is coupled to the boiler water tank and the solar heating unit. Depending on the temperature of the inputted preheated water, the boiler machine further heat water coming from the solar heating unit to a preset exit temperature and stores heated water in the boiler water tank. The control unit is coupled to the solar heating unit and the boiler unit. The control unit controls the solar heating unit and the boiler unit, for controlling the hot water supply system to operate in a pre-heating period and a heating period, in which the pre-heating period is previous to the heating period. In the pre-heating period, the solar heating unit preheats water and stores the preheated water. In the heating period, the solar heating unit outputs the preheated water to the boiler machine, and the boiler machine further heats water coming from the solar heating unit to the preset exit temperature depending on the temperature of the inputted preheated water, and the boiler heating unit stores the heated water in the boiler water tank.

In order to achieve the aforementioned objects, according to an embodiment of the instant disclosure, a hot water supply method is offered. The hot water supply method comprises following steps: (a) in the pre-heating period, controlling the solar heating unit to preheat water and storing the preheated water, and controlling a first heat-pump unit to heat water stored in the boiler water tank; (b) in the heating period, controlling the solar heating unit to provide the preheated water to the boiler machine, controlling the first heat-pump unit to preheat water stored in the first heat-pump unit and store the preheated water, controlling the boiler machine to further heat water coming from the solar heating unit and the first heat-pump unit to the exit temperature depending on the temperature of the inputted preheated water, and controlling the boiler machine to store the heated water in the boiler water tank and the electric heater unit; (c) in an electric heating period, turning off the boiler machine, controlling the first heat-pump unit to heat water stored in the boiler water tank to the exit temperature, controlling the electric heater unit to assist the first heat-pump to heat water coming from the boiler water tank when the temperature of the water stored in the boiler water tank is lower than the exit temperature or the first heat-pump is failure, and providing the heated water to an outflow device.

In order to further the understanding regarding the instant disclosure, the following embodiments are provided along with illustrations to facilitate the disclosure of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
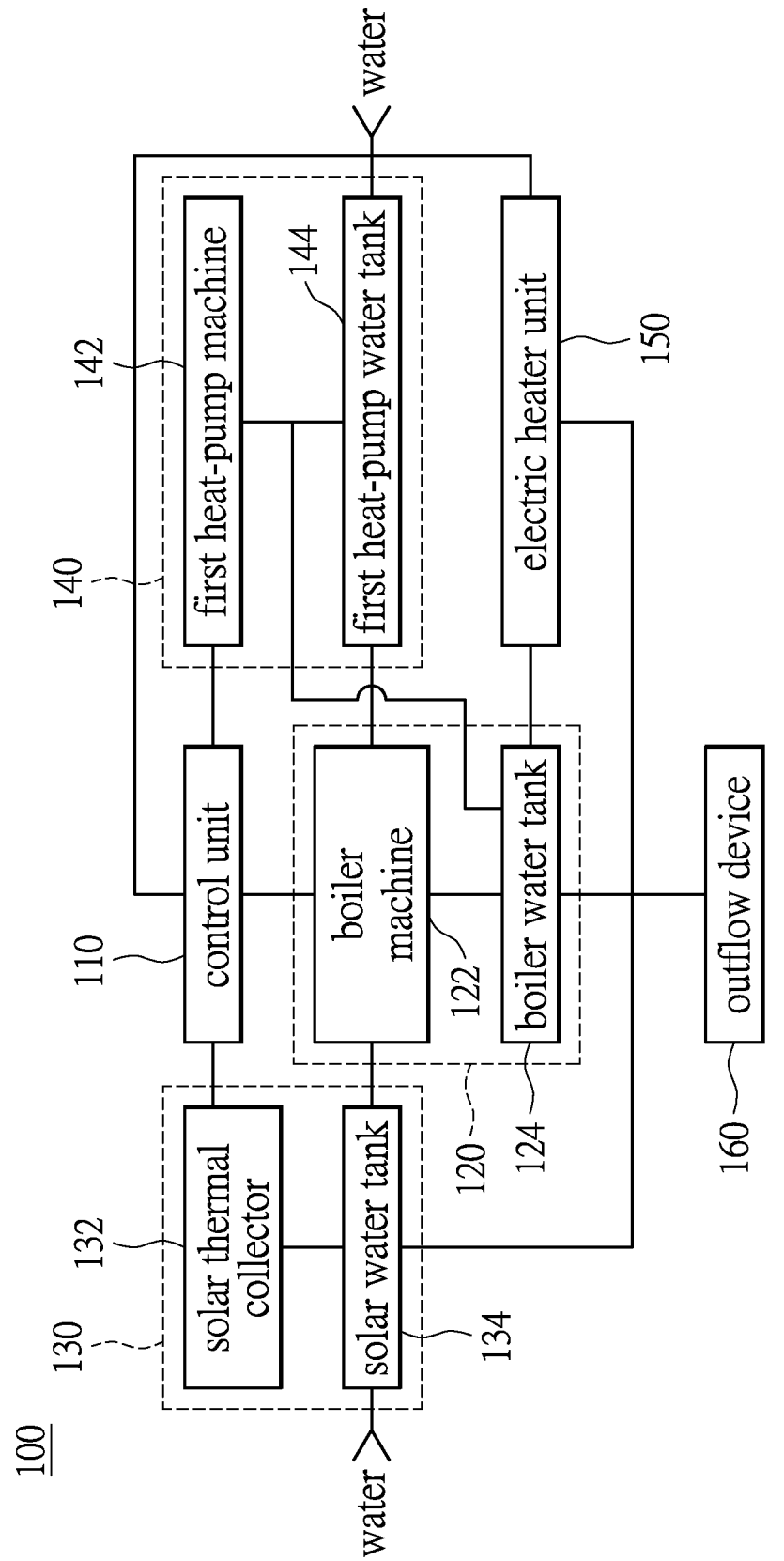
FIG. 1 shows a block diagram of a hot water supply system according to an embodiment of the instant disclosure.

Firstly, referring to FIG. 1, a hot water supply system 100 comprises a control unit 110 and a plurality of water heaters. The plurality of water heaters comprises a boiler unit 120, a solar heating unit 130, a first heat-pump unit 140 and an electric heater unit 150. The solar heating unit 130 and the first heat-pump unit 140 respectively have a solar water tank 134 and a first heat-pump water tank 144 for storing water, for preheating water and providing preheated water to the boiler unit 120. The boiler unit 120 directly provides water for user(s) or further heats water to an exit temperature. The source of the water may be the waterworks, but the instant disclosure is not so restricted.

The solar heating unit 130 comprises a solar thermal collector 132 and a solar water tank 134. The solar water tank 134 is coupled to the solar thermal collector 132. The solar thermal collector 132 converts light energy from the sun to heat water stored in the solar water tank 134. In this embodiment, the solar heating unit 130 is a solar water heater. Generally, the solar water heater operates in a "stationary phase", a "heating phase", a "balance phase" and a "consumption phase" in the day/night cycle. The stationary phase represents that the solar thermal collector 132 does not receive sunlight, thus the solar thermal collector 132 is unable to heat water stored in the solar water tank 134. The heating phase represents that the solar thermal collector 132 receives sunlight to heat water stored the solar water tank 134. The balance phase means that the solar thermal collector 132 achieves the maximum of thermal collection so as to maintain the temperature of the water stored in the solar water tank 134. The consumption phase represents the users extensively use water stored in the solar water tank 134. Thus, the solar heating unit 130 could be utilized to produce hot water when the solar thermal collector 132 receives sunlight. The solar heating unit 130 not only provides hot water in the daytime, but also provides preheated hater for enhancing the efficiency of hot water generation afterward as well as reducing use of the boiler unit 120.

The first heat-pump unit 140 comprises a first heat-pump machine 142 and a first heat-pump water tank 144, wherein the first heat-pump water tank 144 is coupled to the first heat-pump machine 142. The first heat-pump machine 142 heats the water stored in the boiler water tank 124 or the first heat-pump water tank 144. In this embodiment, the first heat-pump 140 maybe a general heat-pump heater or a high efficiency superconducting heat-pump water heater. Generally, when the heat-pump heater is in operation, with the medium of environmental cold-producing medium, utilizing inputted electricity to operate the compressor cooperating with related components, such as the evaporator, the condenser, the expansion valve, the heater and the controller, in order to carry out high speed heat transfer for heating water. The ambient temperature adapted for operation is $-10°$ C. to $45°$ C., thus the heat-pump heater is suited to be used in Taiwan all the year. Therefore, when the boiler unit 120 is not operate yet, the first heat-pump unit 140 preheats water for inputting to the boiler unit 120, or directly heats water stored in the boiler unit 120 to the exit temperature. Alternatively, when the boiler unit 120 is in operation, the first heat-pump 140 heat water stored in the first heat-pump water tank 144 or enhancing the efficiency of hot water generation afterward as well as reducing use of the boiler unit 120.

Additionally, the solar heating unit 130 further comprises an outflow valve. When the temperature of the water stored in the solar water tank 134 is higher than a first predetermined temperature, the outflow valve would be opened for providing the heated water to an outflow device 160, thus the user(s) could use hot water in water off-peak hours of the daytime. In this embodiment, the outflow device 160 is a shower for providing hot water to the user(s).

The boiler unit 120 comprises a boiler machine 122 and a boiler water tank 124. The boiler machine 122 is coupled to the boiler water tank 124, the solar water tank 134 of the solar heating unit 130 and the first heat-pump tank 144 of the first heat-pump unit 140. The boiler machine 122 further heats preheated water coming from the solar water tank 134 and the first heat-pump water tank 144, and stores the heated water in the boiler water tank 124 for providing hot water to users. In this embodiment, water stored in the solar water tank 134 and the first heat-pump water tank 144 could be pre-stored in the boiler water tank 134 first, then the boiler machine 122 circulates the water stored in the boiler water tank 124 and further heats water to the exit temperature for providing to users. Alternatively, the boiler water tank 124 of the boiler unit 120 could directly stores water coming from exterior water source, then the boiler machine 122 performs cyclic heating to heat the water stored in the boiler water tank 124 until the exit temperature for providing hot water to users.

In this embodiment, the boiler unit 120 is a boiler heater. Generally, the boiler heater burns kerosene to heat water stored in the boiler water tank 124. During the burning process of kerosene, great amounts of carbon dioxide gas are generated which could cause global warming. The hot water supply system utilizes the solar heating unit 130 and the first heat-pump unit 140 to preheat water (to $50°$ C., for example), then utilizes the boiler unit 120 to heat preheated water to the exit temperature (to $60°$ C., for example) which is adapted for users to use, in which use of the boiler unit 120 could be reduced for reducing generation of carbon dioxide.

The electric heater 150 is coupled to the boiler water tank 124 for heating water coming from the boiler water tank 124. The electric heater 150 is mainly to assist the first heat-pump machine 142 when the first heat-pump machine 142 is failure or when the first heat-pump machine 142 could not heat the water stored in the boiler water tank 124 to the exit temperature due to great demand of water. Therefore, the electric heating unit 150 would assist the first heat-pump machine 142 to heat water coming from the boiler water tank 124 to the exit temperature, and provides the heated water to the outflow device. Additionally, when the time is the night preferential electricity tariff period or the water off-peak hours, the electric unit 150 could also directly heats water. In this embodiment, the electric heater unit 150 is the electric water heater. Generally, the electric water heater converts electricity to thermal energy for heating water.

The control unit 110 is coupled to the solar heating unit 130, the first heat-pump unit 140, the boiler unit 120 and the electric heater unit 150. The control unit 110 controls the operations of the solar heating unit 130, the first heat-pump unit 140, the boiler unit 120 and the electric heater unit 150, in order to control the hot water supply system to operate in a pre-heating period, a heating period or an electric heating period, wherein the heating period is after the pre-heating period and before the electric heating period. In this embodiment, the control unit 110 may be a server, but the instant disclosure is not so restricted. In the pre-heating period, the solar heating unit 130 heats the water stored in the solar water tank 134, and the first heat-pump unit 140 heats the water stored in the boiler water tank 124. In this embodiment, the water stored in the solar heating unit 130 is stored in the solar water tank 134, and the solar thermal controller 132 preheats water stored in the solar water tank 134. The first heat-pump machine 142 of the first heat-pump 140 heats the water stored in the boiler water tank 134 to a temperature, the temperature is prefer to $55°$ C. Additionally, when the temperature of the water stored in the solar water tank 134 is higher than a predetermined temperature, the outflow valve is opened. Meanwhile, the water stored in the solar water tank 134 would be transmitted to the outflow device 160 for the users to use in water off-peak hours in daytime. In this embodiment, the first predetermined temperature is preferred to $40°$ C.

In the heating period, the solar heating unit 130 provides the water stored in the solar water tank 134 to the boiler machine 122. The first heat-pump unit 140 heats the water stored in the first heat-pump water tank 144, and provides heated water to the boiler machine 122. The boiler machine 122 heats the water coming from the solar heating unit 130 and the first heat-pump unit 140 to the exit temperature, and stores heated water to the boiler water tank 124. The electric heater unit 150 also receives water coming from the boiler water tank 124. In this embodiment, the first heat-pump machine 142 of the first heat-pump unit 140 heats water stored in the first heat-pump water tank 144 to a second predetermined temperature. The boiler machine 122 heats water coming from the solar water tank 134 and the first heat-pump water tank 144 to the exit temperature. The mentioned second predetermined temperature is lower than the exit temperature. Therefore, the second predetermined temperature is regarded as a preheating temperature before that the boiler machine 122 heats water to the exit temperature. The second predetermined temperature is prefer to 55° C., and the exit temperature is prefer to 60° C. When the control unit 110 operates in the electric heating period, the control unit 110 turns off the boiler machine 122, and the first heat-pump machine 142 is controlled to heat water stored in the boiler water tank 124 to the exit temperature. When the first heat-pump unit 142 is failure or the heating speed of the first heat-pump 142 is not fast enough, the temperature of the water stored in the boiler water tank 124 would be lower than the exit temperature. Meanwhile, the electric heater unit 150 would assist the first heat-pump machine 142 to heat water stored in the boiler water tank 124 to the exit temperature for providing heated water to the outflow device 160. In this embodiment, it is preferred that the electric heater unit 150 heats water stored in the boiler water tank 124 to 60° C.

Figure 3:
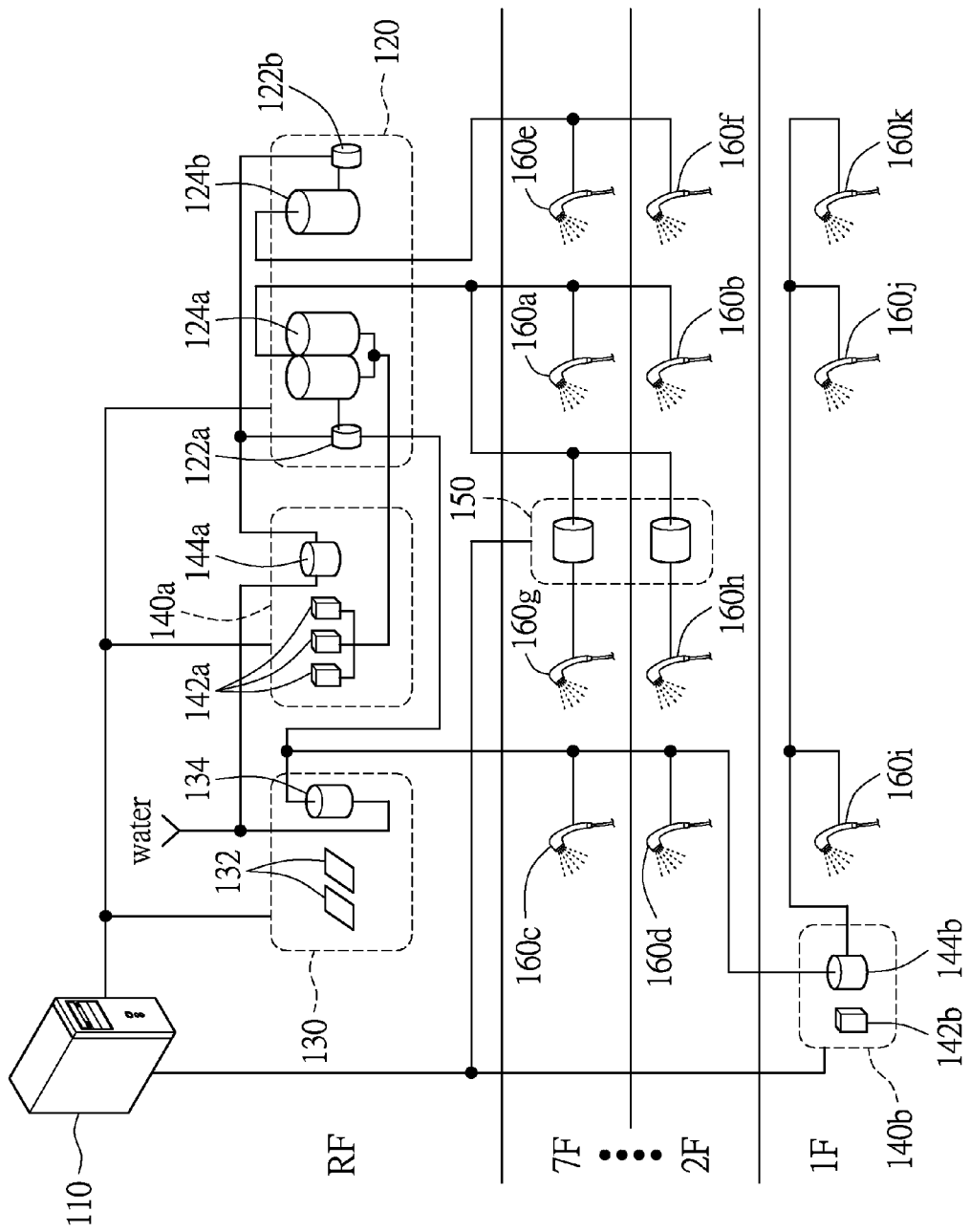
FIG. 3 shows a schematic diagram of a dormitory shower system applying the hot water supply system according to an embodiment of the instant disclosure.

Additionally, referring to FIG. 3, the hot water supply system may further comprise a second heat-pump unit 140b. The second heat-pump unit 140b comprises a second heat-pump machine 142b and a second heat-pump water tank 144b. The second heat-pump water tank 144b is coupled to the solar heating unit 120, and the second heat-pump water tank 144b stores water coming from the solar heating unit 120. The second heat-pump machine 142b heats water stored in the second heat-pump water tank 144b in the electric heating period, the pre-heating period and the heating period for providing heated water to the outflow device. In this embodiment, the second heat-pump unit 140b may be a general heat-pump heater or a high efficiency superconducting heat-pump water heater, which is the same as the first heat-pump unit 140.

The aforementioned hot water supply system 100 is just exemplary. The plurality of water heaters may be the hybrid application of the boiler unit 120 and the solar heating unit 130, the hybrid application of the boiler unit 120 and the first heat-pump unit 140, the hybrid application of the boiler 120, the solar heating unit 130 and the first heat-pump unit 140, or the hybrid application of other types of water heater (such as the terrestrial heat or the recovering heat). The instant disclosure is not restricted thereto.

Take the hybrid application of the boiler unit 120 and the solar heating unit 130 for constituting the hot water supply system 100 for example, the hot water supply system 100 may comprise a control unit 110, a boiler unit 120 and a solar heating unit 130, in which the connection relationships are the same as the connection relationships of the embodiment shown in FIG. 1, thus the redundant information is not repeated. Different from the embodiment shown in FIG. 1, the plurality of water heaters does not include the first heat-pump unit 140 and the electric heater unit 150. Therefore, in the pre-heating period, the solar heating unit 130 heats water stored in the solar water tank 134. In the heating period, the solar heating unit 130 provides water stored in the solar water tank 134 to the boiler machine 122. Then, the boiler machine 122 heats the water coming from the solar water tank 134 to the exit temperature, and stores heated water in the boiler water tank 124 for providing water with exit temperature to the outflow device. The operations and connection relationships of the hot water supply system utilizing other hybrid applications of the water heaters (e.g., the hybrid application of the boiler unit 120 and the first heat-pump unit 140; or the hybrid application of the boiler 120, the solar heating unit 130 and the first heat-pump unit 140) are significantly identical to the operations and connection relationships of the hot water supply system with hybrid application of the boiler unit 120 and the solar heating unit 130, thus the redundant information is not repeated.

Figure 2:
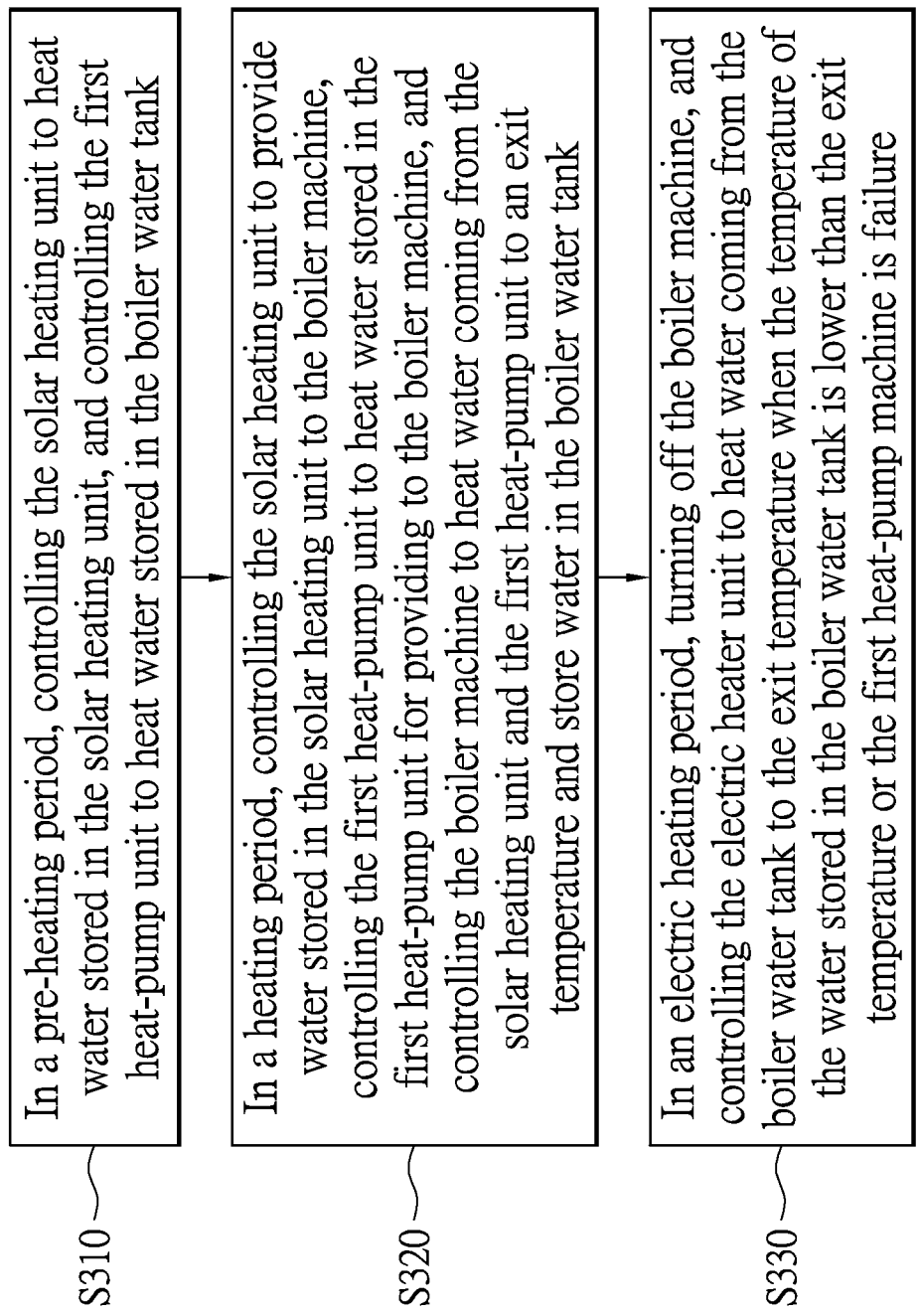
FIG. 2 shows a flow chart of a hot water supply method according to an embodiment of the instant disclosure.
Figure 4:
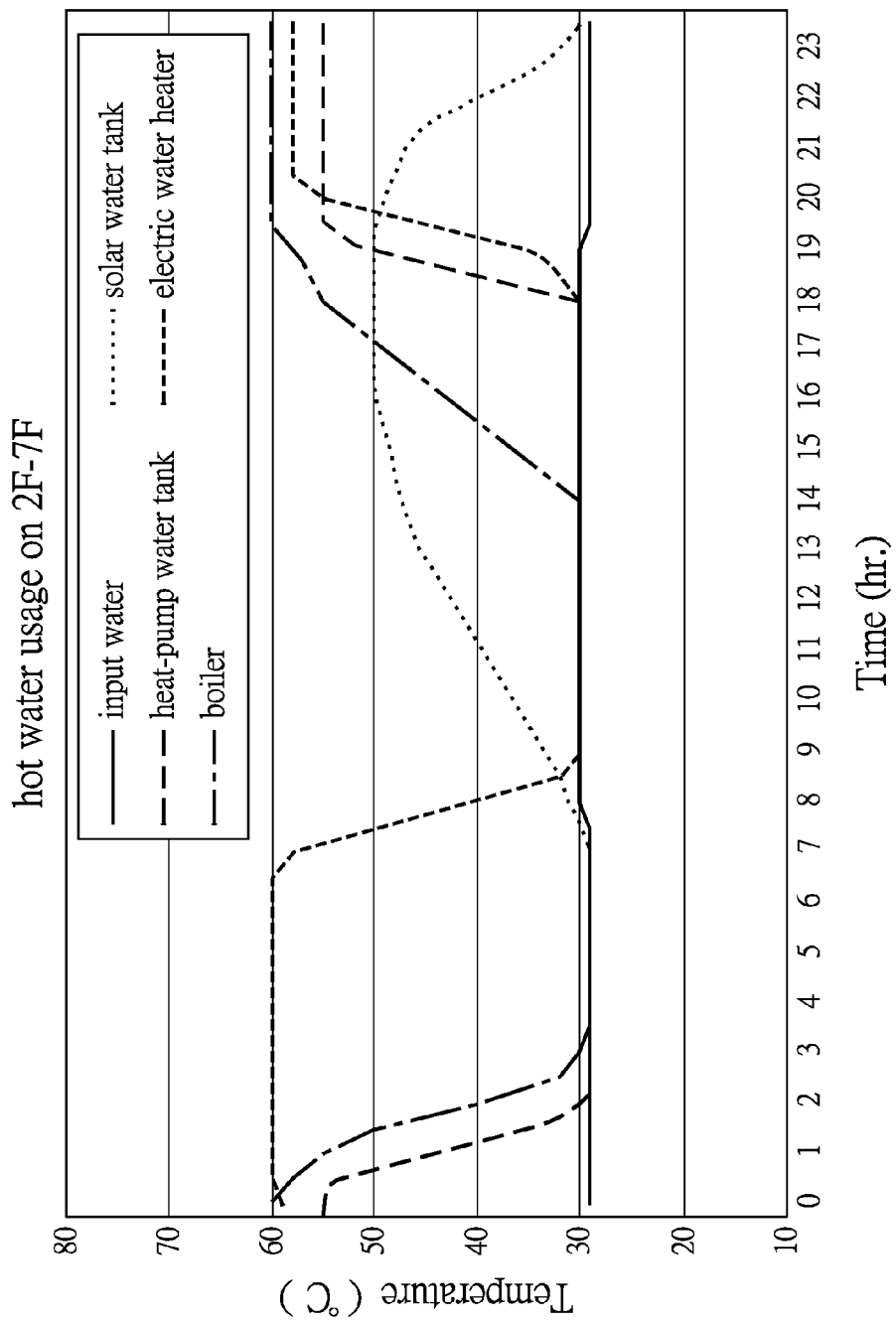
FIG. 4 illustrates hot water supplying status of the dormitory shower system which supplies hot water on the second floor to the seventh floor of the dormitory.

Please refer to FIG. 2 in conjunction with FIG. 3 and FIG. 4. In the following, the hot water supply system is applied to a dormitory shower system. In this embodiment, the dormitory has seven floors (1F-7F) and a roof. The roof is set up with a solar heating unit 130, a first heat-pump unit 140a and a boiler unit 120. The electric heater units 150 are respectively placed on each floor of the floors from 2F to 7F. The second heat-pump unit 140b is placed on the first floor. Additionally, each floor (from 1F to 7F) has the outflow devices for shower, such as the outflow device 160a, 160b, 160c, 160d, 160e, 160f, 160g, 160h, 160i, 160j and 160k.

During a day, the hot water consumption in the time of 07:00-18:00 is the least, the hot water consumption in the time of 18:00-24:00 is the most, and the hot water consumption in the time of 00:00-07:00 which is electricity off-peak hours of nighttime is medium. Additionally, the solar heating unit receives the most of sunlight during 07:00-18:00. Therefore, in this embodiment, the time of 07:00-18:00 is defined as the pre-heating period, the time of 18:00-24:00 is defined as the heating period, and the time of 00:00-07:00 is defined as the electric heating period. The hot water supplying system of this embodiment supplying hot water to the dormitory shower system is described as follows.

In the pre-heating period (07:00-18:00 in this embodiment), the sunlight incidents the solar heating unit 130. Meanwhile, the control unit 110 controls the solar thermal collector 132 of the solar heating unit 130 to heat water stored in the solar water tank 134, and the control unit 110 controls the first heat-pump 140a to heat water stored in the boiler water tank 124a (Step S310). As shown in FIG. 4, the temperature of the inputted water of the solar water tank 134 gradually raises from about 30° C. to 50° C. during the time of 07:00-18:00 (which is the aforementioned the heating phase and the balance phase). The temperature of the inputted water of the boiler water tank 124a gradually raises from about 30° C. to 55° C. during the time of 14:00-18:00. In this pre-heating period, the solar heating unit 130 and the first heat-pump 140a are utilized to preheat water, then the boiler unit 120 heats the preheated water to the exit temperature which is adapted for users to use, and the efficiency of hot water generation could be improved accordingly.

In the pre-heating period, when the temperature of the water stored in the solar water tank 134 is higher than the first predetermined temperature, the outflow valve of the solar heating unit 130 would be opened, in order to providing water stored in the solar water tank 134 to the outflow devices, such as the outflow devices 160c and 160d, on 2F to 7F, for users to use during the daytime water off-peak hours. In this embodiment, the first predetermined temperature is set to 40° C. As shown in FIG. 4, the temperature of the solar water tank 134 is higher than 40° C. after 11:00, and the water stored in the solar water tank 134 would be delivered to the outflow devices on 2F to 7F for user to use, until the temperature of the water is lower than 40° C.

In the heating period (18:00-24:00 in this embodiment), the sunlight would not incident the solar heating unit 130 in nighttime. However, the solar water tank 134 may still store preheated water heated in the pre-heating period. The control unit 110 controls the solar heating unit 130 to provide the water stored in the solar water tank 134 to the boiler machine 122a. The control unit 110 controls the first heat-pump 142a to preheat water stored in the first heat-pump water tank 144a to the second predetermined temperature and provide the preheated water to the boiler machine 122a. And, the control unit 110 controls the boiler machine 122a to heat water coming from the solar water tank 134 and the first heat-pump 144a to the exit temperature and store heated water to the boiler water tank 124a, in order to further provide the heated water stored in the boiler water tank 124a to the outflow devices on 2F to 7F, such as the outflow devices 160a and 160b (Step S320). The electric heater unit 150 also receives and stores water coming from the boiler water tank 124a. In this embodiment, the second predetermined temperature is 55° C., and the exit temperature is 60° C. Also, the control unit 110 could also control the first heat-pump 142a only to preheat water stored in the first heat-pump water tank 144a to the second predetermined temperature and provide the preheated water to the boiler machine 122b. Then, the control unit 110 controls the boiler machine 122b to heat water coming from the first heat-pump water tank 144a to the exit temperature and store heated water in the boiler water tank 124b, in order to further provide the heated water stored in the boiler water tank 124b to the outflow devices on 2F to 7F, such as the outflow devices 160e and 160f.

As shown in FIG. 4, the first heat-pump machine 142a has preheated water stored in the boiler water tank 124a to 55° C. in the pre-heating period. Thus, if the water stored in the boiler water tank 124a should be heated to 60° C. before provided to the outflow devices, the boiler machine 122a only has to heat the preheated water to increase more 5 degrees (° C.). The boiler machine 122a does not need to heat water from initial input temperature (e.g., 30° C.) to 60° C. Therefore, preheating water could greatly decrease the use of the boiler machine 122a for reducing consumption of kerosene. Furthermore, the temperature of the water stored in the solar water tank 134 starts to go down from 50° C. to the initial temperature of the inputted water at 18:00 (which is the beginning of the consumption phase). And, at 18:00, the temperature of the first heat-pump water tank 144a starts to increase to 55° C. As mentioned above, the temperature of the water provided to the boiler machines 122a and 122b for heating is higher than the initial input temperature, thus the boiler machines 122a and 122b do not need to heat water from initial input temperature (e.g., 30° C.) to 60° C., and the consumption of kerosene could be reduced. Additionally, the water in the heat-pump water tank 144a would be provided to the electric heater unit 150 for storing beginning form the time of 18:00. In the electric heating period, when the first heat-pump 142a is failure or the temperature of the water stored in the boiler water tank 124a is lower than 60° C. due to that the heating speed of the first heat-pump 142a is not fast enough, the electric heater unit 150 would assist the first heat-pump unit 142a to heat water stored in the boiler water tank 124a to 60° C. for providing heated water to the outflow devices.

In the electric heating period (00:00-07:00 in this embodiment), the sunlight would not incident the solar heating unit 130. Meanwhile, the temperature of the water stored in the solar water tank 134 would decrease to the input temperature of the water (e.g., 30° C.), and the boiler machine 120 is also turned off. The control unit 110 instead controls the first heat-pump machine 142a to heat water stored in the boiler water tank 124a to the exit temperature for providing heated water to the outflow devices. In the electric heating period, when the first heat-pump 142a is failure or the first heat-pump machine 142a could not heat the water stored in the boiler water tank 124a to the exit temperature due to large hot water consumption, the control unit 110 would control the electric heater unit 150 to assist the first heat-pump unit 142a to heat water stored in the boiler water tank 124a to the exit temperature for providing heated water to the outflow devices on 2F to 7F, such as the outflow devices 160g and 160h (Step 330). As shown in FIG. 4, during 00:00-07:00, the water stored in the solar water tank 144a is decreased to the input temperature (corresponding the aforementioned stationary phase), and the temperature of the boiler water tank 124a is decreased to the input temperature due to that the first heat-pump 140a does not generate sufficient hot water with exit temperature. However, the water stored in the electric heater unit 150 is maintained to 60° C.

Additionally, the second heat-pump machine 142b of the second heat-pump unit 140b would heat water stored in the second heat-pump water tank 144b in the electric heating period, the pre-heating period and the heating period (00:00-24:00 in this embodiment), and the second heat-pump machine 142b provides heated water to the outflow devices on the first floor, such as the outflow devices 160i, 160j and 160k. Therefore, the dormitory shower system could provide hot water in 24 hours of all day.

According to above descriptions, the hot water supply system and method thereof integrate a plurality of water heaters, such as the solar heating unit 130, the first heat-pump unit 140a, the second heat-pump unit 140b, the boiler unit 120 and the electric heater unit 150. The hot water supply system utilizes appropriate water heater to heat water in each period and provides heated water to the outflow devices, or provides heated water for further heating in the boiler unit, in order to improve the efficiency of hot water generation. Additionally, utilizing the plurality of water heater devices to reduce use of the boiler unit, reduce use of kerosene, thus energy saving and carbon reduction could be achieved.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:
1. A hot water supply system, comprising:
a solar heating unit, for heating water;
a boiler unit, comprising a boiler machine and a boiler water tank, the boiler machine coupled to the boiler water tank and the solar heating unit, for heating water coming from the solar heating unit and storing heated water in the boiler water tank;
a control unit, coupled to the solar heating unit and the boiler unit, the control unit controlling the solar heating unit and the boiler unit, controlling the hot water supply system to operate in a pre-heating period and a heating period, the pre-heating period being previous to the heating period; and
a first heat-pump unit, comprising a first heat-pump machine and a first heat-pump water tank, the first heat-pump water tank is coupled to the first heat-pump machine, the first heat-pump unit coupled to the boiler unit and the control unit;
wherein, in the pre-heating period, the solar heating unit preheats water and stores preheated water, and the first heat-pump machine heats water stored in the boiler water tank;
wherein, in the heating period, the solar heating unit provides the preheated water to the boiler machine, the first heat-pump machine preheats water stored in the first heat-pump water tank and stores the preheated water, and the boiler machine heats water coming from the solar heating unit and the first heat-pump water tank to an exit temperature and stores the heated water in the boiler water tank.

2. The hot water supply system according to claim 1, further comprising an electric heater unit, the electric heater unit coupled to the control unit and the boiler water tank, wherein the electric heater unit receives water coming from the boiler water tank in the heating period.

3. The hot water supply system according to claim 2, wherein the hot water supply system operates in an electric heating period after the heating period, and in the electric heating period the control unit turns off the boiler machine and the electric heater unit heats water coming from the boiler water tank to the exit temperature when the temperature of the water stored in the boiler water tank is lower than the exit temperature or the first heat-pump unit is failure.

4. The hot water supply system according to claim 1, wherein the solar heating unit comprises a solar thermal collector and a solar water tank, the solar water tank is coupled to the solar thermal collector, the solar water tank heats water stored in the solar water tank.

5. The hot water supply system according to claim 1, wherein the solar heating unit comprises an outflow valve, the outflow valve is opened to provide the heated water to an outflow device when the temperature of the water stored in the solar heating unit is higher than a first predetermined temperature.

6. The hot water supply system according to claim 1, wherein, in the heating period, the first heat-pump unit heats water stored in the first heat-pump unit to a second predetermined temperature, and the boiler machine heats the water coming from the solar heating unit and the first heat-pump unit to the exit temperature, the second predetermined temperature is lower than the exit temperature.

7. The hot water supply system according to claim 1, further comprising a second heat-pump unit, the second heat-pump unit comprising a second heat-pump machine and a second heat-pump water tank, the second heat-pump water tank coupled to the solar heating unit and storing water coming from the solar heating unit, the control unit controlling the second heat-pump machine to heat water stored in the second heat-pump water tank to the exit temperature for providing water to an outflow device.

8. A hot water supply method according to claim 1, comprising:
controlling the solar heating unit to preheat water and storing the preheated water, and controlling a first heat-pump unit to heat water stored in the boiler water tank in the pre-heating period; and
controlling the solar heating unit to provide the preheated water to the boiler machine, controlling the first heat-pump unit to preheat water stored in the first heat-pump unit to a second predetermined temperature and stores the preheated water, and controlling the boiler machine to heat water coming from the solar heating unit and the first heat-pump unit to the exit temperature and store the heated water in the boiler water tank in the heating period, wherein the second predetermined temperature is lower than the exit temperature and the first heat-pump unit is coupled to the boiler machine and the control unit.

9. The hot water supply method according to claim 8, wherein, in the heating period, an electric heater unit receives water from the boiler water tank, wherein the electric heater unit is coupled to the control unit and the boiler water tank.

10. The hot water supply method according to claim 9, wherein the how water supply system operates in an electric heating period after the heating period, and in the electric heating period turning off the boiler machine and controlling the electric heater unit to heat water coming from the boiler water tank to the exit temperature when the temperature of the water stored in the boiler water tank is lower than the exit temperature or the first heat-pump unit is failure.

11. The hot water supply method according to claim 8, wherein the solar heating unit comprises an outflow valve, the outflow valve is opened to provide the heated water to an outflow device when the temperature of the water stored in the solar heating unit is higher than a first predetermined temperature.

12. The hot water supply method according to claim 8, wherein the hot water supply system further comprises a second heat-pump unit, the second heat-pump water tank is coupled to the solar heating unit and stores water coming from the solar heating unit, and the control unit controls the second heat-pump unit to heat water stored in the second heat-pump unit to the exit temperature for providing water to an outflow device.

* * * * *